(12) United States Patent
Douarre

(10) Patent No.: US 6,420,471 B1
(45) Date of Patent: Jul. 16, 2002

(54) FILM-FORMING SUBSTANCE FOR TEMPORARILY OPACIFYING TRANSPARENT OR TRANSLUCENT SURFACES

(76) Inventor: Patrick Douarre, 82, chemin de la Venelle, Carqueiranne (FR)

( * ) Notice: Subject to any disclaimer, the term of this patent is extended or adjusted under 35 U.S.C. 154(b) by 0 days.

(21) Appl. No.: 09/673,729

(22) PCT Filed: Apr. 22, 1999

(86) PCT No.: PCT/FR99/00960
§ 371 (c)(1),
(2), (4) Date: Oct. 20, 2000

(87) PCT Pub. No.: WO99/55769
PCT Pub. Date: Nov. 4, 1999

(30) Foreign Application Priority Data

Apr. 23, 1998 (FR) .............................. 98 05341

(51) Int. Cl.[7] .............................. C08K 3/26; C08K 5/04; C08K 5/09
(52) U.S. Cl. .................. 524/425; 524/399; 524/413; 524/423; 524/432; 524/493; 523/222
(58) Field of Search ................ 523/222; 524/399, 524/413, 423, 425, 432, 493

(56) References Cited

U.S. PATENT DOCUMENTS

| | | | |
|---|---|---|---|
| 4,126,594 A | 11/1978 | Peters et al. | |
| 4,626,559 A | 12/1986 | Sadler et al. | |
| 4,742,093 A | 5/1988 | Sadler et al. | |
| 4,882,372 A | 11/1989 | Woo et al. | |
| 4,902,566 A | 2/1990 | Wood et al. | |
| 5,256,716 A | 10/1993 | Haasl et al. | |

FOREIGN PATENT DOCUMENTS

| | | |
|---|---|---|
| FR | 2333015 | 11/1976 |
| JP | 62246984 | 10/1987 |

Primary Examiner—Kriellion A. Sanders
(74) Attorney, Agent, or Firm—Greenblum & Bernstein, P.L.C.

(57) ABSTRACT

The invention concerns a film-forming substance for temporarily opacifying transparent or translucent surfaces made of glass or rigid or flexible plastic, such as, for instance, agricultural or horticultural greenhouse covering, characterized in that it contains, in slightly alkaline water: at least one binding agent consisting of a resin based on acrylic derivatives, having an acid index higher than 60; and at least a filler or pigment selected, for example, among the following; silica or silicate; barium sulphate; titanium oxide; zinc oxide; mineral or organic colored pigment.

23 Claims, No Drawings

FILM-FORMING SUBSTANCE FOR TEMPORARILY OPACIFYING TRANSPARENT OR TRANSLUCENT SURFACES

BACKGROUND OF THE INVENTION

1. Field of the Invention

The present invention relates to a film-forming substance for temporarily opacifying transparent or translucent surfaces made of glass or rigid or flexible plastic (film), for example, in order to protect greenhouses from insolation.

2. Discussion of Background Information

According to a particularly interesting, although non-limiting application, the present invention addresses a problem currently encountered by farmers and horticulturists who must protect their greenhouse crops from the insolation effects.

The problem is to find an opacifying, rain-resistant substance that can be eliminated easily and quickly at the end of an extremely sunny season, or during a hot, temporarily sunless season, if necessary.

The products that are currently used do not make it possible to solve this problem in a satisfactory manner, but only partially by applying either irritating acid based liquids, which are very harmful to the environment, the greenhouses armatures, and the films made of plastic or, exceptionally, liquids based on alkaline agents whose cleaning efficiency on the associated paint is markedly inadequate and not immediate.

Practically, it is always necessary to brush the greenhouse glazings to obtain a good result, which farmers do not appreciate at all, in view of the waste of time and the danger posed by roofs difficult to access.

U.S. Pat. No. 4,626,559 proposes a non-permanent ornamental paint adapted to be applied on vehicles to indicate "their sponsors," for example, in a race, and which has the advantage of not damaging the outer coating of the vehicles. This non-permanent ornamental paint includes an acid acrylic resin in aqueous dispersion and the non-permanent paint can be removed with water by rubbing.

Furthermore, the removal of traditional screen substances based on aqueous dispersion of styrene acrylic ester copolymers or acrylate copolymers is impossible with alkaline medium.

SUMMARY OF THE INVENTION

The present invention relates to a film-forming aqueous composition for temporarily opacifying at least one transparent or translucent surface of a greenhouse, the surface being made of a material selected from glass, rigid plastic or flexible plastic, the aqueous composition comprising: an alkaline agent; at least two binders constituted by at least two resins based on acrylic derivatives, each having an acid index greater than 60, wherein at least one of the at least two binders is in solid form and the other is in aqueous dispersion; and at least one filler or pigment.

The at least one filler can be selected from calcium carbonate, silica, silicate, barium sulphate, titanium oxide, or zinc oxide. Preferably, the at least one filler is calcium carbonate and the calcium carbonate has a particle size of 1 $\mu$m.

The at least one pigment can be selected from mineral or organic colored pigment.

The at least one binder in dry form can be present in an amount from 0.5 to 3 weight percent of the total weight of the composition. Preferably, the at least one binder in dry form comprises methyl methacrylate.

The film-forming composition can also include at least one of cellulose ether thickening agent, dispersing agent, antifoaming agent or bactericide.

In a preferred aspect of the present invention, the cellulose ether thickening agent can be present in an amount of 0.1 to 0.5 weight percent of the total weight of the composition. The at least one dispersing agent can be selected from ammonium polyacrylate or potassium polycarboxylate and can be present in an amount of 0.1 to 2 weight percent of the total weight of the composition. The anti-foaming agent can be present in an amount of 0.1 to 0.4 weight percent of the total weight of the composition. The bactericide can be present in an amount of 0.1 to 0.3 weight percent of the total weight of the composition; and finely ground calcium carbonate and organic pigment can be present in an amount from 40 to 60 weight percent of the total weight of the composition, the remainder being water; and wherein the at least one binder in dry form can be present in an amount from 0.5 to 3 weight percent and wherein the alkaline agent is 25% strength ammonia and can be present in an amount from 0.2 to 0.6 weight percent of the total weight of the composition.

The present invention also relates to a method for temporarily opacifying at least one transparent or translucent surface of a greenhouse, the surface being made of a material selected from glass, rigid plastic or flexible plastic, comprising: applying to the at least one transparent or translucent surface an aqueous film-forming aqueous composition comprising a first alkaline agent, at least two binders constituted by at least two resins based on acrylic derivatives, each having an acid index greater than 60, wherein at least one of the at least two binders is in solid form and the other is in aqueous dispersion; and at least one filler or pigment, thereby forming an opacifying film on the at least one transparent or translucent surface, the opacifying film being capable of removal.

The at least one filler can be selected from calcium carbonate, silica, silicate, barium sulphate, titanium oxide, or zinc oxide. Preferably, the at least one filler is calcium carbonate and has a particle size of 1 $\mu$m.

The at least one pigment can be selected from mineral or organic colored pigment.

In another aspect of the present invention, the method for temporarily opacifying at least one transparent or translucent surface of a greenhouse provides for removing the opacifying film with an aqueous cleaning solution comprising a second alkaline agent selected from sodium hydroxide, sodium carbonate, sodium salt of ethylene diamine tetraacetic acid or mixtures thereof or alternatively for removing the opacifying film with an acid aqueous cleaning solution.

In a preferred aspect of the present invention, the opacifying film can be removed by spraying the aqueous cleaning solution.

In another aspect of the present invention, the cleaning solution can contain the second alkaline agent in an amount from 0.2 to 3 weight percent of the total weight of the aqueous cleaning solution.

In yet another aspect of the present invention, the at least one binder in dry form can be present in an amount from 0.5 to 3 weight percent of the total weight of the composition and preferably comprises methyl methacrylate.

The film-forming composition can further comprise at least one of cellulose ether thickening agent, dispersing agent, antifoaming agent or bactericide.

In another preferred aspect of the present invention, the film-forming composition can further comprise cellulose ether thickening agent in an amount of 0.1 to 0.5 weight percent of the total weight of the composition, at least one dispersing agent selected from ammonium polyacrylate or potassium polycarboxylate in an amount of 0.1 to 2 weight percent of the total weight of the composition, anti-foaming agent in an amount of 0.1 to 0.4 weight percent of the total weight of the composition, bactericide in an amount of 0.1 to 0.3 weight percent of the total weight of the composition, and finely ground calcium carbonate or organic pigment in an amount from 40 to 60 weight percent of the total weight of the composition, the remainder being water, and wherein the at least one binder in dry form can be present in an amount from 0.5 to 3 weight percent and wherein the first alkaline agent is 25% strength ammonia and can be present in an amount from 0.2 to 0.6 weight percent of the total weight of the composition.

According to an embodiment of the present invention, the film-forming opacifying composition is slightly alkaline and comprises at least two binders constituted by two resins based on acrylic derivatives, having an acid index greater than 60, one being in solid form and the other being in aqueous dispersion; and at least one filler or pigment.

This filler can be selected from calcium carbonate, silica, silicate, barium sulphate, titanium oxide, or zinc oxide. The pigment can be selected from mineral or organic colored pigment.

This composition has good rainwater resistance. After being coated and dried, the composition is capable of being removed easily and quickly by spraying a slightly alkaline aqueous solution containing 0.2–3% by total weight, of one or more alkaline agents selected, for example, from sodium hydroxide, sodium carbonate, or sodium salt of ethylene diamine tetraacetic acid (EDTA).

It must be noted that this substance also has the property of being eliminated completely by an acid based solution non-classified as irritant.

This efficiency is obtained due to the presence, in slightly alkaline aqueous medium, of a specific binder in the composition. It is a resin or the combination of a plurality of resins based on acrylic derivatives, having a high acid index (greater than 60), contrary to the aqueous dispersions of styrene acrylic ester copolymers or of acrylate copolymers that are currently used, and which remain nonsaponifiable.

A good compromise between rainwater resistance and ease of subsequent elimination of the opacifying film in slightly alkaline medium can be obtained by associating two acrylic binders having a high acid index (one in solid form and the other in aqueous dispersion).

By varying the proportion of one with respect to the other, one promotes either the ease of elimination (due to the solid acrylic), especially in the case of precocious elimination of the opacifying film, or rainwater resistance (due to the acrylic in aqueous dispersion).

DETAILED DESCRIPTION OF THE PRESENT INVENTION

Interesting results are obtained, for example, with a film-forming opacifying substance in the form of a white paint whose composition by weight comprises 25 percent strength ammonia in an amount from 0.2–0.6%, dry binder based on acrylic derivatives (solid or in aqueous dispersion having an acid index greater than 60) in an amount of 0.5–3%, cellulose ether thickening agent in an amount from 0.1–0.5%, ammonium polyacrylate or potassium polycarboxylate dispersing agent in an amount from 0.1–2%, antifoaming agent in an amount from 0.1–0.4%, bactericide in an amount from 0.1–03%, and finely ground calcium carbonate in an amount from 40–60%, the remainder being water.

One kilogram of this paint formula is diluted with three liters of water before being applied, the film-forming product after application and air drying having a good opacifying power. It is possible to vary the dilution ratio with water depending on the desired degree of opacity and rainwater resistance.

Advantageously, the dry binder based on acrylic derivatives is based on methyl methacrylate.

While the binder is very specific, all of the other constituents are commonly used in all house paints in aqueous phase. The cellulose ether thickening agent makes it possible to adjust the paint viscosity so as to avoid decanting during storage. The dispersing agent makes it possible to facilitate the dispersion of the calcium carbonate filler, so as to avoid the agglomerates of particles and a change in viscosity over time. The products commonly used as the dispersing agents are based on ammonium polyacrylate or potassium polycarboxylate. The bactericide enables the paint to be conserved in a pot. A chloracetamide based aqueous solution can be used as the bactericide. The antifoaming agent makes it possible to avoid bubbling during the manufacture of the paint. A mixture of hydrophobic substances is generally used in a paraffin mineral oil as the antifoaming agent. Calcium carbonate is a filler making it possible to provide the paint with opacifying power. In the case of the film-forming opacifying substance for greenhouses, a filler having a very fine particle size, on the order of 1 micron, is preferably used.

Other constituents can be added or can replace the aforementioned calcium carbonate filler. These constituents can be fillers based on calcium carbonate having different particle sizes; fillers based on silical or silicate; fillers based on barium sulphate; white pigments based on titanium or zinc oxide or mineral or organic colored pigments.

The invention also relates to the method for temporarily opacifying translucent or transparent surfaces, such as agricultural or horticultural greenhouse coverings made of glass or rigid or flexible plastic, this method comprising applying a film-forming opacifying substance, such as described hereinabove, on these surfaces, at the beginning of periods of strong sunshine, and wherein the film of paint previously applied is removed at the beginning of periods of light sunshine, by means of a cleaning aqueous solution containing at least one alkaline agent selected from sodium hydroxide, sodium carbonate, or sodium salt of ethylene diamine tetraacetic acid (EDTA); whose total proportion by weight is 0.2–3%.

What is claimed is:

1. A film-forming aqueous composition for temporarily opacifying at least one transparent or translucent surface of a greenhouse, the surface being made of a material selected from glass, rigid plastic or flexible plastic, the aqueous composition comprising:
   an alkaline agent;
   at least two binders constituted by at least two resins based on acrylic derivatives, each having an acid index greater than 60, wherein at least one of the at least two binders is in solid form and the other is in aqueous dispersion; and
   at least one filler or pigment.

2. The film-forming composition according to claim 1, wherein the at least one filler is selected from calcium carbonate, silica, silicate, barium sulphate, titanium oxide, or zinc oxide.

3. The film-forming composition according to claim 2, wherein the at least one filler is calcium carbonate.

4. The film-forming composition according to claim 3, wherein the calcium carbonate has a particle size of 1 μm.

5. The film-forming composition according to claim 1, wherein the at least one pigment is selected from mineral or organic colored pigment.

6. The film-forming composition according to claim 1, wherein the at least one binder in dry form is present in an amount from 0.5 to 3 weight percent of the total weight of the composition.

7. The film-forming composition according to claim 1, wherein the at least one binder in dry form comprises methyl methacrylate.

8. The film-forming composition according to claim 1, further comprising at least one of cellulose ether thickening agent, dispersing agent, antifoaming agent or bactericide.

9. The film-forming composition according to claim 1, further comprising:
   cellulose ether thickening agent in an amount of 0.1 to 0.5 weight percent of the total weight of the composition;
   at least one dispersing agent selected from ammonium polyacrylate or potassium polycarboxylate in an amount of 0.1 to 2 weight percent of the total weight of the composition;
   anti-foaming agent in an amount of 0.1 to 0.4 weight percent of the total weight of the composition;
   bactericide in an amount of 0.1 to 0.3 weight percent of the total weight of the composition; and
   finely ground calcium carbonate and organic pigment in an amount from 40 to 60 weight percent of the total weight of the composition, the remainder being water; and wherein the at least one binder in dry form is in an amount from 0.5 to 3 weight percent and wherein the alkaline agent is 25% strength ammonia in an amount from 0.2 to 0.6 weight percent of the total weight of the composition.

10. A method for temporarily opacifying at least one transparent or translucent surface of a greenhouse, the surface being made of a material selected from glass, rigid plastic or flexible plastic, comprising:
   applying to the at least one transparent or translucent surface an aqueous film-forming aqueous composition comprising a first alkaline agent, at least two binders constituted by at least two resins based on acrylic derivatives, each having an acid index greater than 60, wherein at least one of the at least two binders is in solid form and the other is in aqueous dispersion; and at least one filler or pigment, thereby forming an opacifying film on the at least one transparent or translucent surface, the opacifying film being capable of removal.

11. The method for temporarily opacifying at least one transparent or translucent surface of a greenhouse according to claim 10, wherein the at least one filler is selected from calcium carbonate, silica, silicate, barium sulphate, titanium oxide, or zinc oxide.

12. The method for temporarily opacifying at least one transparent or translucent surface of a greenhouse according to claim 11, wherein the at least one filler is calcium carbonate.

13. The method for temporarily opacifying at least one transparent or translucent surface of a greenhouse according to claim 12, wherein the calcium carbonate has a particle size of 1 μm.

14. The method for temporarily opacifying at least one transparent or translucent surface of a greenhouse according to claim 10, wherein the at least one pigment is selected from mineral or organic colored pigment.

15. The method for temporarily opacifying at least one transparent or translucent surface of a greenhouse according to claim 10, further comprising:
   removing the opacifying film with an aqueous cleaning solution comprising a second alkaline agent selected from sodium hydroxide, sodium carbonate, sodium salt of ethylene diamine tetraacetic acid or mixtures thereof.

16. The method for temporarily opacifying at least one transparent or translucent surface of a greenhouse according to claim 15, wherein the opacifying film is removed by spraying the aqueous cleaning solution.

17. The method for temporarily opacifying at least one transparent or translucent surface of a greenhouse according to claim 10, further comprising:
   removing the opacifying film with an acid aqueous cleaning solution.

18. The method for temporarily opacifying at least one transparent or translucent surface of a greenhouse according to claim 17, wherein the opacifying film is removed by spraying the acid aqueous cleaning solution.

19. The method for temporarily opacifying at least one transparent or translucent surface of a greenhouse according to claim 15, wherein the cleaning solution contains the second alkaline agent in an amount from 0.2 to 3 weight percent of the total weight of the aqueous cleaning solution.

20. The method for temporarily opacifying at least one transparent or translucent surface of a greenhouse according to claim 10, wherein the at least one binder in dry form is present in an amount from 0.5 to 3 weight percent of the total weight of the composition.

21. The method for temporarily opacifying at least one transparent or translucent surface of a greenhouse according to claim 10, wherein the at least one binder in dry form comprises methyl methacrylate.

22. The method for temporarily opacifying at least one transparent or translucent surface of a greenhouse according to claim 10, wherein the film-forming composition further comprises at least one of cellulose ether thickening agent, dispersing agent, antifoaming agent or bactericide.

23. The method for temporarily opacifying at least one transparent or translucent surface of a greenhouse according to claim 10, wherein the film-forming composition further comprises:
   cellulose ether thickening agent in an amount of 0.1 to 0.5 weight percent of the total weight of the composition;
   at least one dispersing agent selected from ammonium polyacrylate or potassium polycarboxylate in an amount of 0.1 to 2 weight percent of the total weight of the composition;
   anti-foaming agent in an amount of 0.1 to 0.4 weight percent of the total weight of the composition;
   bactericide in an amount of 0.1 to 0.3 weight percent of the total weight of the composition; and
   finely ground calcium carbonate or organic pigment in an amount from 40 to 60 weight percent of the total weight of the composition, the remainder being water, and wherein the at least one binder in dry form is in an amount from 0.5 to 3 weight percent and wherein the first alkaline agent is 25% strength ammonia in an amount from 0.2 to 0.6 weight percent of the total weight of the composition.

* * * * *